US011128497B1

(12) United States Patent
Sun et al.

(10) Patent No.: US 11,128,497 B1
(45) Date of Patent: Sep. 21, 2021

(54) DECISION FEEDBACK EQUALIZER WITH FRACTIONAL TAP UNROLLING

(71) Applicant: Credo Technology Group Limited, Grand Cayman (KY)

(72) Inventors: Junqing (Phil) Sun, Fremont, CA (US); Fang Cai, Milpitas, CA (US); Tianchen Luo, Milpitas, CA (US); Haoli Qian, Fremont, CA (US)

(73) Assignee: Credo Technology Group Limited, Grand Cayman (KY)

( * ) Notice: Subject to any disclaimer, the term of this patent is extended or adjusted under 35 U.S.C. 154(b) by 0 days.

(21) Appl. No.: 16/920,115

(22) Filed: Jul. 2, 2020

(51) Int. Cl.
*H04L 25/03* (2006.01)
*H04L 27/01* (2006.01)

(52) U.S. Cl.
CPC .. *H04L 25/03057* (2013.01); *H04L 25/03146* (2013.01); *H04L 25/03267* (2013.01); *H04L 25/03885* (2013.01); *H04L 27/01* (2013.01); *H04L 2025/0349* (2013.01)

(58) Field of Classification Search
CPC ................................................. H04L 25/03057
USPC ......................................................... 375/233
See application file for complete search history.

(56) References Cited

U.S. PATENT DOCUMENTS

| 9,071,479 | B2 | 6/2015 | Qian et al. |
| 9,935,800 | B1 | 4/2018 | He |
| 2004/0032905 | A1* | 2/2004 | Dittrich ............... H03H 21/0012 375/233 |
| 2011/0116806 | A1* | 5/2011 | He ..................... H04L 25/03019 398/158 |
| 2012/0314756 | A1* | 12/2012 | Leibowitz ............. H03M 1/123 375/233 |
| 2018/0102897 | A1* | 4/2018 | Kudo ...................... H03L 7/087 |

OTHER PUBLICATIONS

Corresponds to U.S. Appl. No. 16/691,523, filed Nov. 21, 2019.

* cited by examiner

*Primary Examiner* — Lihong Yu
(74) *Attorney, Agent, or Firm* — Ramey and Schwaller, LLP

(57) ABSTRACT

Decision feedback equalizers and equalization methods may employ fractional tap unrolling and/or probability-based decision threshold placement. One illustrative fractional tap unrolling equalization method embodiment includes: tracking preceding symbol decisions; converting an equalized signal into tentative symbol decisions with a precompensation unit; and selecting from the tentative symbol decisions based on the preceding symbol decisions. The precompensation unit has a decision element for each combination of a first number of speculative preceding symbols, with comparators in each decision element using a first type of symbol decision threshold that accounts for trailing intersymbol interference from the corresponding combination, and with an additional comparator in at least one of the decision elements using a second type of symbol decision threshold that accounts for trailing intersymbol interference from a second number of speculative preceding symbols, the second number being greater than the first.

13 Claims, 5 Drawing Sheets

DECISION FEEDBACK EQUALIZER WITH FRACTIONAL TAP UNROLLING

BACKGROUND

Digital communications occur between sending and receiving devices over an intermediate communications medium, or "channel" (e.g., a fiber optic cable or insulated copper wires). Each sending device typically transmits symbols at a fixed symbol rate, while each receiving device detects a (potentially corrupted) sequence of symbols and attempts to reconstruct the transmitted data. A "symbol" is a state or significant condition of the channel that persists for a fixed period of time, called a "symbol interval." A symbol may be, for example, an electrical voltage or current level, an optical power level, a phase value, a particular frequency or wavelength, a spin value, or an angular momentum. A change from one channel state to another is called a symbol transition. Each symbol may represent (i.e., encode) one or more binary bits of the data. Alternatively, the data may be represented by symbol transitions, or by a sequence of two or more symbols.

Many digital communication links use only one bit per symbol; a binary '0' is represented by one symbol (e.g., an electrical voltage or current signal within a first range), and a binary '1' by another symbol (e.g., an electrical voltage or current signal within a second range), but higher-order signal constellations are known and frequently used. In 4-level pulse amplitude modulation ("PAM4"), each symbol interval may carry any one of four symbols, denoted as $-3$, $-1$, $+1$, and $+3$. Two binary bits can thus be represented by each symbol.

Channel non-idealities produce dispersion which may cause each symbol to perturb its neighboring symbols, a consequence known as inter-symbol interference ("ISI"). ISI can make it difficult for the receiving device to determine which symbols were sent in each interval, particularly when such ISI is combined with additive noise.

To combat noise and ISI, receiving devices may employ various equalization techniques. Linear equalizers generally have to balance between reducing ISI and avoiding noise amplification. Decision Feedback Equalizers ("DFE") are often preferred for their ability to combat ISI without inherently amplifying the noise. As the name suggests, a DFE employs a feedback path to remove ISI effects derived from previously-decided symbols. Unfortunately, it may be infeasible to implement such a feedback path at symbol rates approaching or exceeding 10 GHz in silicon-based integrated circuits. "Unrolled" DFE architectures attempt to address this difficulty through the use of speculative "precompensation" units, but the size and power consumption of such units grows exponentially with the number of filter taps in the feedback path.

SUMMARY

Accordingly, there is provided herein decision feedback equalizers and equalization methods employing fractional tap unrolling and/or probability-based decision threshold placement. One illustrative fractional tap unrolling equalizer embodiment includes a register, a precompensation unit, and a multiplexer. The register tracks preceding symbol decisions. The precompensation unit includes multiple decision elements each having comparators using a symbol decision threshold of a first type, and further includes an additional comparator in at least one of the decision elements using a symbol decision threshold of a second type. The first type of symbol decision threshold accounts for trailing intersymbol interference ("ISI") from a first number of speculative preceding symbols, the combination of speculative preceding symbols being different for each decision element. The second type of symbol decision threshold accounts for trailing ISI from a second number of speculative preceding symbols greater than the first number. The multiplexer supplies symbol decisions to the register by selecting, based on the preceding symbol decisions, from tentative symbol decisions of the decision elements.

An illustrative equalization method embodiment includes: tracking preceding symbol decisions; converting an equalized signal into tentative symbol decisions with a precompensation unit; and selecting from the tentative symbol decisions based on the preceding symbol decisions. The precompensation unit has a decision element for each combination of a first number of speculative preceding symbols, with comparators in each decision element using a first type of symbol decision threshold that accounts for trailing intersymbol interference from the corresponding combination, and with an additional comparator in at least one of the decision elements using a second type of symbol decision threshold that accounts for trailing intersymbol interference from a second number of speculative preceding symbols, the second number being greater than the first.

An illustrative equalization method employing probability-based decision threshold placement includes: tracking preceding symbol decisions; filtering a received signal with a feed forward equalizer (FFE) filter to obtain an equalized signal; converting the equalized signal into tentative symbol decisions with a precompensation unit; selecting a subsequent symbol decision from the tentative symbol decisions based on the preceding symbol decisions; deriving upper and lower edge positions from the equalized signal for each decision eye; and using the upper and lower edge positions to adjust the symbol decision thresholds.

An illustrative equalizer embodiment employing probability-based decision threshold placement includes: a register, a precompensation unit, a multiplexer, a level finder, and a controller. The register tracks preceding symbol decisions. The precompensation unit includes a decision element for each combination of a predetermined number of speculative preceding symbols, with comparators in each decision element using symbol decision thresholds that account for trailing intersymbol interference from the corresponding combination. The multiplexer supplies symbol decisions to the register by selecting, based on the preceding symbol decisions, from tentative symbol decisions of the decision elements. The level finder derives upper and lower edge positions from the equalized signal for each decision eye. The controller adjusts the symbol decision thresholds based on the upper and lower edge positions.

Each of the foregoing embodiments may be implemented individually or conjointly, together with any one or more of the following optional features in any suitable combination: 1. a summer that subtracts a feedback signal from a filtered signal to produce the equalized signal. 2. a feedback filter that derives the feedback signal from the preceding symbol decisions. 3. the preceding symbol decisions from which the feedback signal is derived include a preceding symbol decision accounted for by the second type of symbol decision threshold, the feedback signal compensating for a linear component of trailing intersymbol interference and the second type of decision threshold compensating for a nonlinear component of the trailing intersymbol interference. 4. each of the decision elements provides a tentative symbol decision to the multiplexer in a thermometer-coded format. 5.

each of the decision elements includes a digitizer that converts outputs of the comparators into a binary number representation of a tentative symbol decision. 6. the digitizers of the decision elements having the additional comparator each include a multiplexer to substitute an output of the additional comparator for another comparator output when a preceding symbol decision has a predetermined value. 7. each of the decision elements is switchable between non-return to zero ("NRZ") and 4-level pulse amplitude modulation ("PAM4") symbols. 8. a level finder that finds a position above or below which the equalized signal occurs with a predetermined probability. 9. the level finder determines said position conditioned upon a predetermined pattern for the preceding or subsequent symbol decisions. 10. combining the equalized signal with the subsequent symbol decision to obtain an error signal or error polarity signal. 11. adapting coefficients of the FFE filter based on the error.

DETAILED DESCRIPTION

Figure 1:
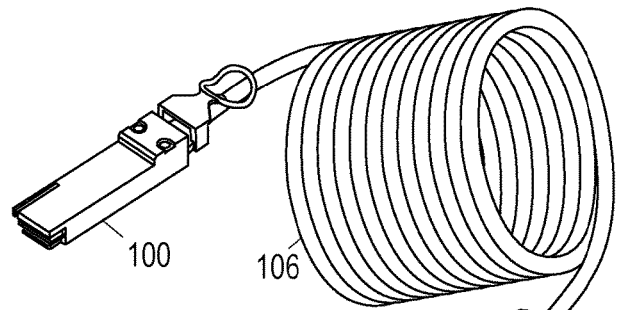
FIG. 1 shows an illustrative active Ethernet cable (AEC).

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

FIG. 1 is a perspective view of an illustrative cable that may be used to provide a high-bandwidth communications link between devices in a routing network such as that used for data centers, server farms, and interconnection exchanges. The routing network may be part of, or may include, for example, the Internet, a wide area network, or a local area network. The linked devices may be computers, switches, routers, and the like. The cable includes a first connector 100 and a second connector 101 that are connected via a cord 106. The cord 106 provides one or more communication channels in the form of optical and/or electrical conductors that may be individually and collectively shielded to reduce signal crosstalk. Each connector 100, 101, includes a powered transceiver, hereafter called a data recovery and re-modulation ("DRR") device, that performs clock and data recovery ("CDR") and re-modulation of data streams. The DRR devices each process data streams traveling in each direction, optionally converting between non-return to zero ("NRZ") and 4-level pulse amplitude modulation ("PAM4") or between other different signaling formats.

Figure 2:
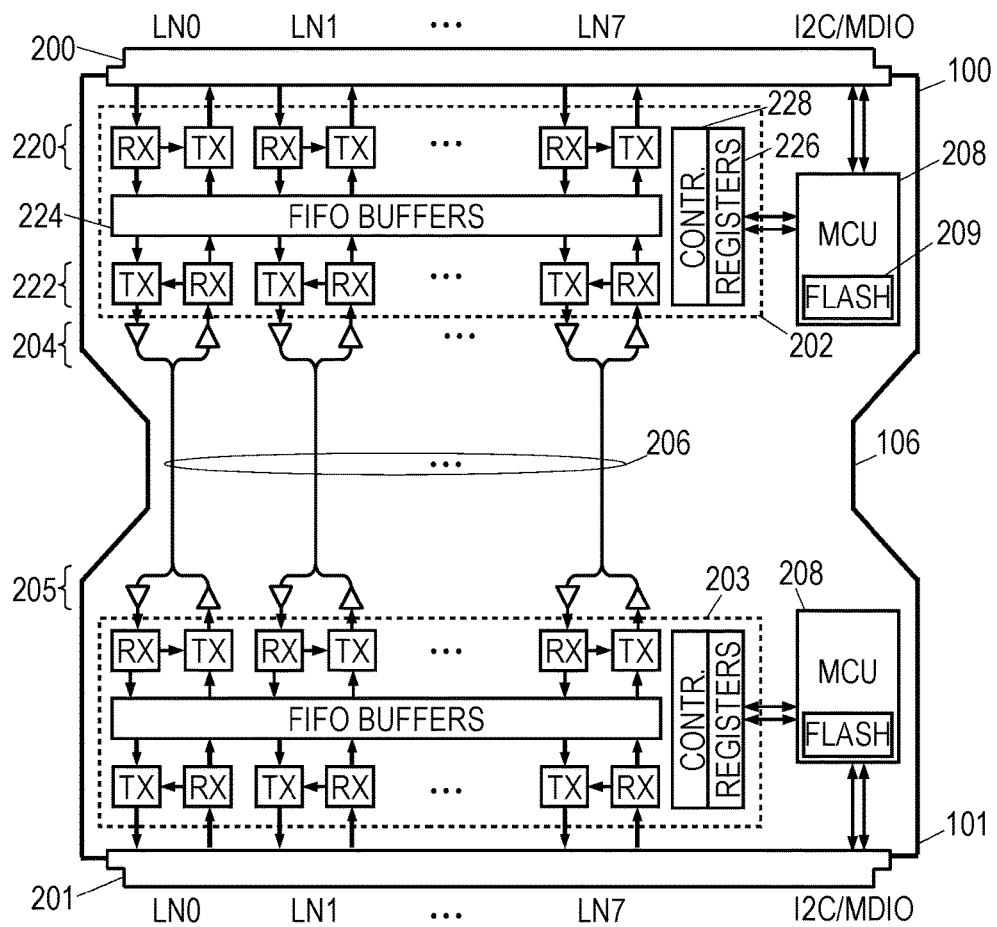
FIG. 2 is a block diagram of an illustrative AEC.

FIG. 2 is a function-block diagram of the illustrative cable of FIG. 1. Connector 100 includes a plug 200 adapted to fit a standard-compliant Ethernet port in a first host device to receive electrical signals carrying an outbound data stream from the host device and to provide electrical signals carrying an inbound data stream to the host device. Similarly, connector 101 includes a plug 201 that fits an Ethernet port of a second host device. Connector 100 includes a first DRR device 202 to perform CDR and re-modulation of the data streams entering and exiting the cable at connector 100, and connector 101 includes a second DRR device 203 to perform CDR and re-modulation of the data streams entering and exiting the cable at connector 101.

The DRR devices 202, 203 may be integrated circuits mounted on a printed circuit board and connected to connector plug contacts via circuit board traces. The printed circuit board in each connector may further support optical transceivers 204, 205 that convert the data streams between electrical and optical signal form for transport via optical fibers 206 in cord 106. In at least some contemplated embodiments, the printed circuit boards each also support a micro-controller unit (MCU) 208. Each DRR device 202, 203 is coupled to a respective MCU device 208 which configures the operation of the DRR device via a two-wire bus. At power-on, the MCU device 208 loads equalization parameters from Flash memory 209 into the DRR device's configuration registers 226. The host device can access the MCU device 208 via a second two-wire bus that operates in accordance with the I2C bus protocol and/or the faster MDIO protocol. With this access to the MCU device 208, the host device can adjust the cable's operating parameters and monitor the cable's performance.

Each DRR device 202, 203, includes a set 220 of transmitters and receivers for communicating with the host device and a set 222 of transmitters and receivers for sending and receiving via communication channels running the length of the cable. The illustrated cable supports eight bidirectional communication lanes LN0-LN7, each bidirectional lane conveyed via an optical fiber with wavelength multiplexing. The DRR devices optionally include a memory 224 to provide first-in first-out (FIFO) buffering between the transmitter & receiver sets 220, 222. An embedded controller 228 coordinates the operation of the transmitters and receivers by, e.g., setting initial equalization parameters and ensuring the training phase is complete across all lanes and links before enabling the transmitters and receiver to enter the data transfer phase. The embedded controller 228 employs a set of registers 226 to receive commands and parameter values, and to provide responses potentially including status information and performance data.

In at least some contemplated embodiments, the host-facing transmitter and receiver set 220 employ fixed equalization parameters that are cable-independent, i.e., they are not customized on a cable-by-cable basis. The center-facing transmitter and receiver set 222 preferably employ cable-dependent equalization parameters that are customized on a cable-by-cable basis. The cable-dependent equalization parameters may be adaptive or fixed, and initial values for these parameters may be determined during manufacturer tests of the cable. The equalization parameters may include filter coefficient values for pre-equalizer filters in the transmitters, and gain and filter coefficient values for the receivers.

Figure 3:
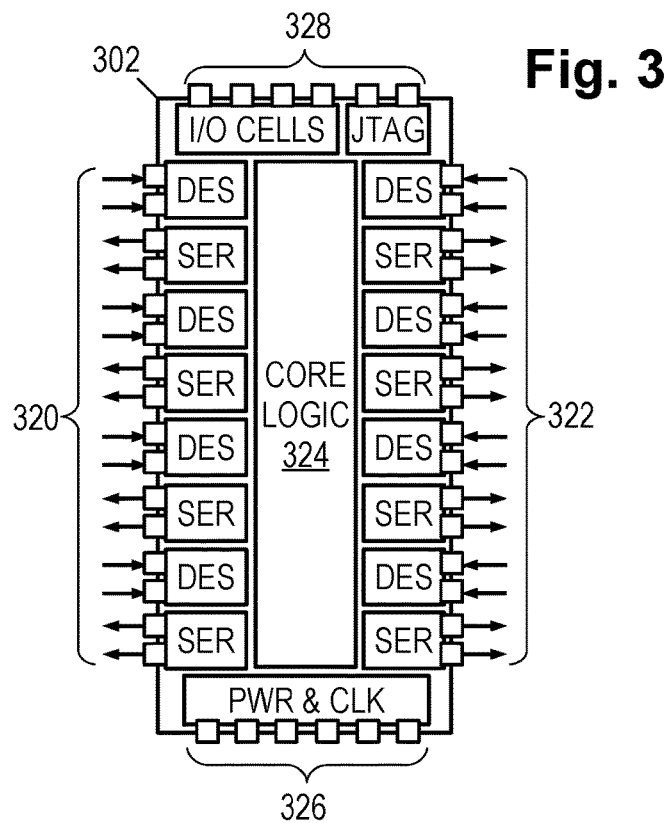
FIG. 3 is a block diagram of an illustrative transceiver integrated circuit.

FIG. 3 shows an illustrative high-speed serializer/deserializer ("SerDes") retimer chip 302, which serves here as an example of an integrated circuit DRR device. Chip 302 includes SerDes modules with contacts 320 for receiving and transmitting high-rate serial bitstreams across eight lanes in one direction, additional SerDes modules with contacts 322 for receiving and transmitting the high-rate serial bitstreams across eight lanes in another direction, and core logic 324 for implementing a channel communications protocol while buffering bitstreams between the two directions. Also included are various supporting modules and contacts 326, 328, such as power regulation and distribution, clock generation, digital input/output lines for control signals, and a JTAG module for built-in self testing.

The "deserializer" implements the receiving function of the chip 302, implementing decision feedback equalization (DFE) or any other suitable equalization technique, e.g., linear equalization, partial response equalization. At the contemplated symbol rates (above 50 Gbaud), the chosen equalizer operates under severe timing constraints.

Figure 4:
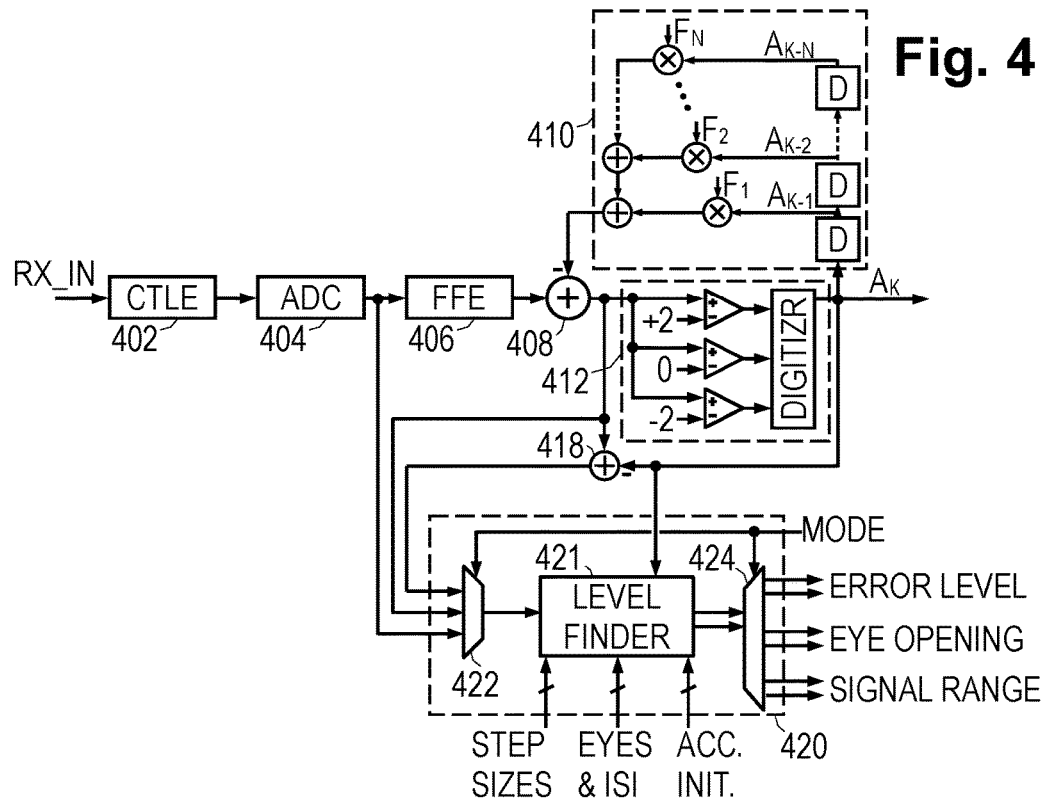
FIG. 4 shows an illustrative decision feedback equalizer (DFE) implementation.

FIG. 4 shows an illustrative implementation of a DFE configured for PAM4. A continuous time linear equalization ("CTLE") filter 402 provides analog filtering to bandlimit the signal spectrum while boosting high-frequency components of the receive signal RX_IN. An analog-to-digital converter ("ADC") 404 digitizes the filtered signal, and a digital feed-forward equalization ("FFE") filter 406 reduces the length of the channel impulse response while minimizing leading inter-symbol interference ("ISI"). A summer 408 subtracts a feedback signal, provided by feedback filter 410, from the output of the FFE filter 406 to minimize the effects of trailing ISI in the equalized signal. A decision element 412, sometimes called a "slicer", operates on the equalized signal to determine which symbol it represents in each symbol interval. The resulting stream of symbol decisions is denoted $A_k$, where k is the time index.

In the illustrated example, the symbols are presumed to be PAM4 (−3, −1, +1, +3), so the comparators employed by decision element 412 use the decision thresholds −2, 0, and +2, respectively. (The unit for expressing symbol and threshold values is omitted for generality, but for explanatory purposes may be presumed to be volts.) The comparator outputs can be taken collectively as a thermometer-coded digital representation of the output symbol decision, or a digitizer may optionally be used to convert the comparator outputs into a binary number representation, e.g., 00 to represent −3, 01 to represent −1, 10 to represent +1, and 11 to represent +3. Alternatively, a Gray-coded representation could be employed. An illustrative digitizer implementation is described in detail below with reference to FIG. 10.

The DFE generates the feedback signal with a feedback filter 410 having a series of delay elements D (e.g., latches, flip flops, or shift registers) that store the recent output symbol decisions ($A_{k-1}$, $A_{k-2}$, . . . , $A_{k-N}$, where N is the number of filter coefficients $F_i$). A set of multipliers determines the product of each symbol with a corresponding filter coefficient, and a series of summers combines the products to obtain the feedback signal.

As an aside, we note here that a timing recovery unit and a filter coefficient adaptation unit are typically included with any practical DFE implementation, but such considerations are addressed in the literature and generally known to those skilled in the art. Nevertheless we note here that at least some contemplated embodiments include one or more additional comparators to be employed for comparing the combined signal to one or more of the extreme symbol values (−3, +3), thereby providing an error polarity signal that can be used for timing recovery with, e.g., a "bang-bang" design. We further note that the adaptation unit may employ the error polarity signal to adapt the coefficients of both the front end filter 406 and the feedback filter 410 during a training phase when a known symbol sequence is employed.

The illustrative implementation of FIG. 4 further includes a summer 418 that subtracts the symbol decision $A_k$ from the equalized signal to obtain an equalization error signal, and a multi-mode level finder 420. The multi-mode level finder 420 includes a dual level finder 421 with an input multiplexer 422 and an output demultiplexer 424. A mode selection signal MODE causes input multiplexer 422 to select one of: the unequalized signal at the input of the FFE filter 406, the equalized signal at the input of the decision element 412, and the equalization error signal calculated by summer 418. The MODE signal also causes the demultiplexer 424 to direct the detected signal levels respectively to one of: a signal range output, an eye opening output, and an error level output.

Dual level finder 421 is described in detail in co-owned U.S. application Ser. No. 16/691,523, filed 2019 Nov. 21 and titled "A Multi-Function Signal Measurement Circuit for ADC-based SerDes", which is hereby incorporated herein by reference in its entirety. The level finder's operating parameters include step sizes, symbol patterns (to indicate desired eyes and/or potentially interfering symbols), and initial accumulator settings, which can be set independently for each of the dual level finders. When the stream of output symbol decisions match the level finder's given pattern, the level finder updates its accumulator using the provided up and down step sizes. A feedback path is used to drive the accumulator contents to a level determined by the ratio of the up and down step sizes, such that the contents represent a level at which the input signal has a given probability of exceeding the level. Thus, as an example, the dual level finder 421 can determine upper and lower levels of the unequalized signal range at which the probability of the level being exceeded is, say, $2^{-10}$ and $1-2^{-10}$ (approximately 0.001 and 0.999, respectively).

Figure 5:
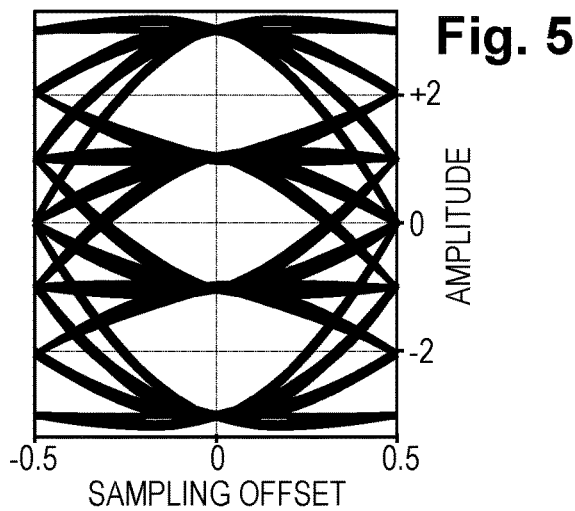
FIG. 5 shows an illustrative eye diagram.

Momentarily looking ahead, FIG. 5 shows an illustrative eye diagram for a PAM4 signal at the input to decision element 412. The diagram represents a superposition of all possible signal combinations (with added noise and intersymbol interference) that may occur in the transition from a previous sampling interval to a current sampling interval. The eye diagram reveals three eyes: a first eye $E_{-2}$ around the −2 decision threshold, a second eye $E_0$ around the 0 decision threshold, and a third eye $E_2$ around the +2 decision threshold. Larger eyes provide more separation between the typical signal level and the decision threshold, thereby enabling the system to better tolerate noise and thus providing reduced error rates.

Figure 6:
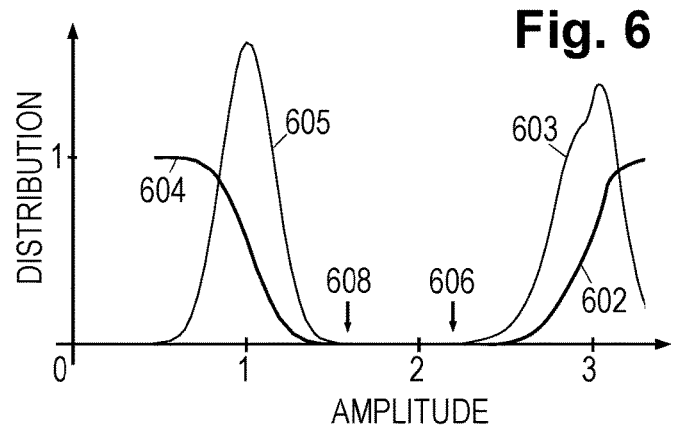
FIG. 6 shows an illustrative bathtub curve.

Each eye has an upper lid and a lower lid. For example, the upper lid of eye $E_2$ is formed by the equalized signals representing +3 in the current symbol interval, and the lower lid is formed by the equalized signals representing +1 in the current interval. FIG. 6 is an illustrative "bathtub" plot, showing a cumulative distribution function ("CDF") 602 for the upper lid, i.e., the probability that the equalized signal representing +3 has a value below the given amplitude. FIG. 6 also shows an approximate probability distribution function (PDF) 603 (not to scale), corresponding to the derivative of CDF 602.

For the lower lid, FIG. 6 shows a CDF 604 representing the probability that the equalized signal representing +1 has a value above the given amplitude, and a approximate PDF 605 corresponding to the magnitude of the derivative of CDF 604. While PDF 605 has an approximately normal distribution peak, PDF 603 has a skewed distribution peak attributable to optical channel nonlinearities. The level finder 421 might accordingly determine that, for a given signal probability, the upper lid of eye $E_2$ occurs at point 606 (shown at an amplitude of approximately 2.19) and lower lid occurs at point 608 (shown at approximately 1.59). To minimize the symbol or bit error rate, the decision threshold should be positioned midway between the lids, i.e., 1.89 in this example rather than the +2 shown in FIG. 4. In this fashion, the decision thresholds for each of the eyes may be set or adapted to minimize the error rate.

Returning to FIG. 4, the dual level finder 420 accepts programmable eye edge selections, so that the controller for the receiver is able to iterate the level finder through the options to measure the size of each eye. The mode selection signal causes the input mux 422 to forward the slicer input signal to the dual level finder (and the demux 424 to forward the finder's adaptively-determined levels to registers for storing eye opening information). For the selected eye edges, the level finder operates to find an lower (slicer input has only a given chance of falling below) edge or an upper (slicer input has only a given chance of falling above) edge. The controller can then set the decision threshold midway between these edges to minimize error probability.

Figure 7:
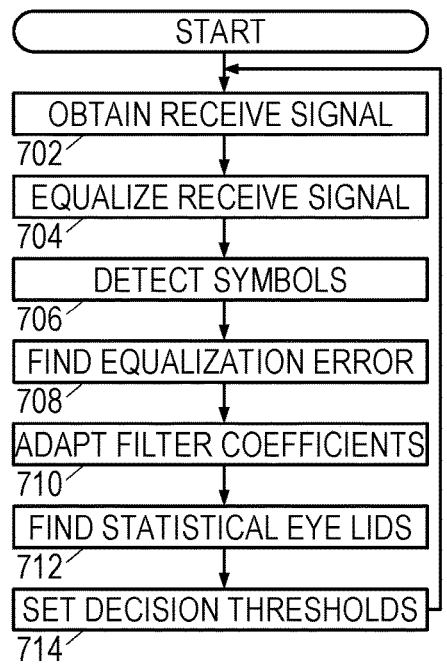
FIG. 7 is a flow diagram of an illustrative adaptive equalization method.

This method may be expressed in terms of a flow diagram as shown in FIG. 7. The DFE obtains a digital receive signal in block 702, equalizes it using a FFE filter and feedback signal in block 704, forms symbol decisions using a decision element in block 706, and calculates equalization error (or at least an error polarity signal) in block 708. The DFE optionally adapts coefficients of the FFE and feedback filters in block 710. In block 712, the DFE tracks the statistical levels of the upper and lower edges of each decision eye, and in block 714, the DFE adjusts the decision thresholds used by the comparators in the decision element, positioning the thresholds midway between the eye lids so as to minimize error rates.

Referring back to the DFE of FIG. 4, it should be noted that the feedback filter 410 is forced to complete its operation in less than one symbol interval because its output depends in part upon the immediately preceding symbol decision. At very high data rates, one symbol interval does not provide sufficient time to finish the filter multiplications and the feedback subtraction. Accordingly, one solution that has been proposed in the literature is "unrolling" the feedback filter.

Figure 8:
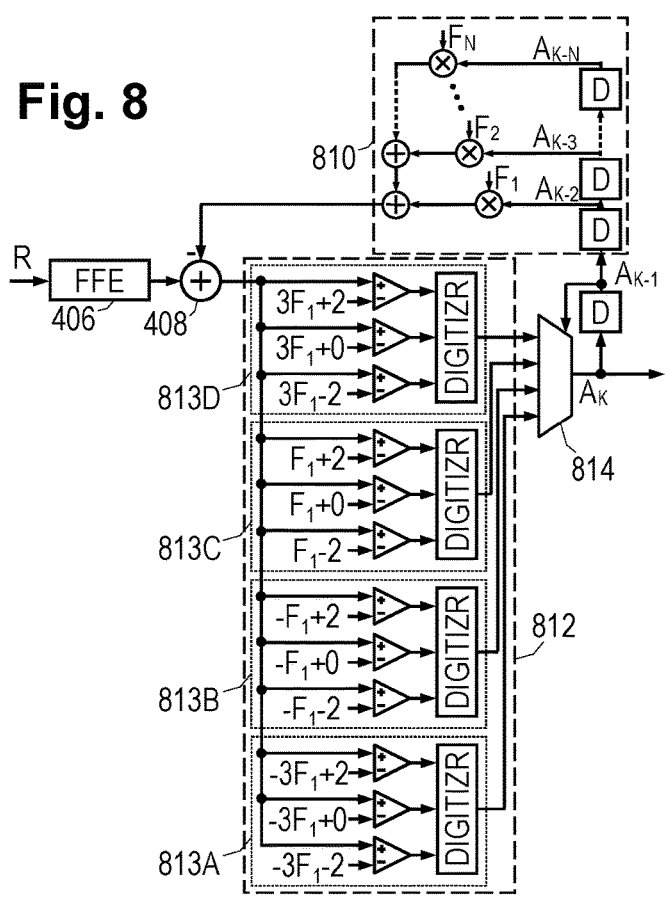
FIG. 8 is an illustrative partially unrolled DFE implementation.

FIG. 8 shows an illustrative variation of FIG. 4 that unrolls the feedback filter by one tap. The embodiment of FIG. 8 employs the same front end filter 406, but summer 408 subtracts a feedback signal to remove the trailing ISI caused by all but the immediately preceding symbol. For each possible value of the immediately preceding symbol, a precompensation unit 812 provides a decision element 813A-813D. Decision element 813A speculatively assumes that the preceding symbol was −3, and rather than subtracting the ISI that would result from this symbol (−3*$F_1$, where $F_1$ is the coefficient of the first tap in the original feedback filter 410), the thresholds of the comparators in decision element 813A have been adjusted relative to the thresholds of decision element 412 by adding −3*$F_1$, enabling decision element 813A to form a tentative symbol decision based on this speculative assumption.

Similarly, decision elements 813B, 813C, and 813D employ comparators with suitably adjusted thresholds to render tentative decisions under the speculative assumptions that the preceding symbol was −1, +1, and +3, respectively. The precompensation unit 812 supplies these tentative decisions to a multiplexer 814, which selects the proper tentative decision based on the immediately preceding symbol decision $A_{k-1}$. Feedback filter 810 has a reduced number of taps (filter coefficients), but otherwise operates similarly to feedback filter 410.

This unrolling step increases the number of elements in the DFE loop (i.e., in the loop including summer 408, precompensation unit 812, multiplexer 814, delay element $A_{k-1}$, and feedback filter 810), but only the elements of the inner loop (i.e., the loop including multiplexer 814 and delay element $A_{k-1}$) need to achieve their operations in less than one symbol interval. The remaining DFE loop elements can take up to two symbol intervals to complete their pipelined operation. If it is still a challenge to complete the feedback filter operation in time, further unrolling can be performed.

Though the decision element thresholds are shown as a function of their nominal value combined with a function of one or more feedback tap values, in practice the thresholds may each be independently set to minimize the bit error rate, e.g., using a level finder 420 (FIG. 4). For example, the method of FIG. 7 may be applied. Although this method was described using the eye diagram of FIG. 5, in which the eyes are diagramed without regard to the preceding symbol, unrolling the feedback filter enables the decision thresholds to be set while taking into account the preceding symbol. Thus, for example, the thresholds for decision element 813A can be determined with the presumption that the preceding symbol is −3. This presumption changes the shape of the eyes, potentially shifting the optimal decision threshold, particularly in the presence of nonlinear channel effects.

Note that the FFE filter 406 may be optimized to shorten the trailing ISI (and thereby minimize the number of feedback filter taps N). If N equals one, a single unrolling step would be sufficient to entirely eliminate the feedback filter 810. For N equals two, an additional unrolling step could be used to eliminate the feedback filter. However, the additional unrolling step would take the number of comparators from $3*4^1=12$ to $3*4^2=48$, significantly increasing power consumption. Additional unrolling steps would exponentially increase the number of comparators to $(P-1)*P^T$, where P is the number of amplitude modulation symbols and T is the number of taps unrolled from the feedback filter, unless a strategy is employed to limit the number of comparators. See, e.g., U.S. Pat. No. 9,935,800 ("Reduced Complexity Precomputation for Decision Feedback Equalizer"), which is hereby incorporated herein by reference in its entirety.

To limit the number of comparators when unrolling is employed (with or without a complexity reduction strategy such as that disclosed in the '800 patent), there is proposed herein a technique which we term "fractional tap unrolling". This technique does not take a full unrolling step, but rather adds only an intermediate number of comparators. For example, in FIG. 9, the precompensation unit 912 has 14 comparators, a number intermediate between one unrolled tap ($3*4^1$) and two unrolled taps ($3*4^2$). The comparators using the original thresholds shown in FIG. 8 remain present in FIG. 9, speculatively accounting for a single preceding symbol. As will become clear, the added comparators use thresholds that speculatively account for an additional preceding symbol, i.e., two preceding symbols in this example. To distinguish the thresholds accounting for one preceding symbol from the thresholds accounting for two preceding symbols, they may be referred to herein as thresholds of the first and second types, respectively.

Figure 9:
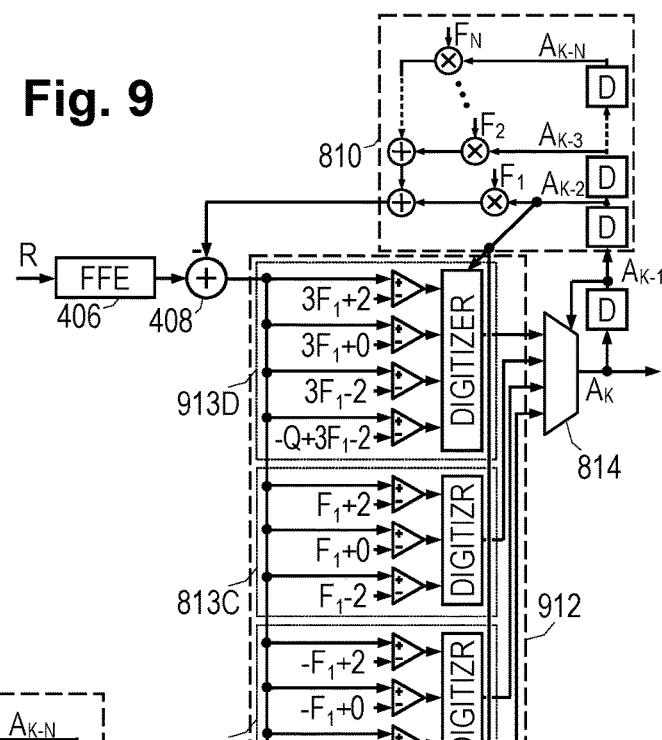
FIG. 9 is an illustrative DFE with fractional tap unrolling.

Precompensation unit 912 include four decision elements corresponding to the decision elements 813A-813D of FIG. 8, speculatively presuming that the preceding symbol is −3, −1, +1, and +3, respectively. In FIG. 9, decision element 813A is replaced by decision element 913A, which includes the original comparators for the three decision eyes $E_{-2}$, $E_0$, $E_2$, each speculatively assuming a preceding symbol of −3, and including an additional comparator for the topmost decision eye $E_2$, which in addition to speculatively assuming a preceding symbol ($A_{k-1}$) of −3, further assumes a twice-preceding symbol ($A_{k-2}$) of +3. (The +3, −3, +3 symbol pattern may experience a nonlinear channel loss in optical fiber.) Similarly, decision element 813D is replaced by decision element 913D, which includes the original comparators speculatively assuming a preceding symbol $A_{k-1}$ of +3, and an additional comparator for the bottommost decision eye $E_{-2}$, which in addition to the preceding symbol assumption of +3, further speculatively assumes a twice-preceding symbol $A_{k-2}$ of −3. (The −3, +3, −3 symbol pattern may also experience a nonlinear channel loss.)

In the embodiment of FIG. 9, the feedback filter 810 compensates for the linear portion of the trailing ISI for the twice-preceding symbol $A_{k-2}$ and subsequent symbols, so that the additional comparators need only compensate for the nonlinear portion of the trailing ISI (shown as "Q" for a twice-preceding symbol $A_{k-2}$ value of +3). In an another contemplated embodiment, the feedback filter 810 is omitted and the additional comparators compensate for both the linear and nonlinear portions of the trailing ISI.

As previously mentioned, the figures show nominal values for the decision thresholds. Though the decision thresholds can be determined based on measurements of trailing ISI coefficients, in practice it is more likely that the decision thresholds (and filter coefficients) are determined adaptively or based on eye lid position measurements.

Note that the digitizers in the modified decision elements 913A,D may perform their conversion based in part on the twice-preceding symbol $A_{k-2}$. Alternatively, the multiplexer 814 or another downstream component may selectively incorporate the additional comparator output.

Figure 10:
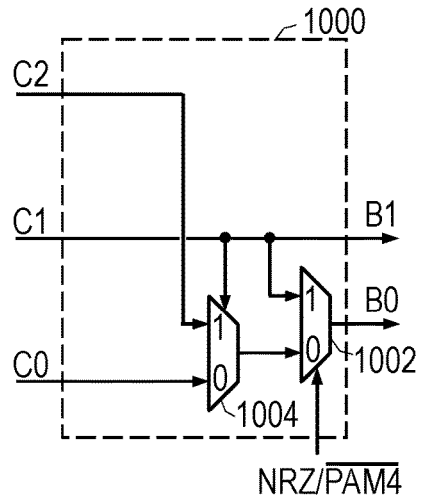
FIG. 10 is a schematic of an illustrative digitizer.

FIG. 10 shows a contemplated digitizer 1000 suitable for use in decision element 412 (FIG. 4) and decision elements 813A-D (FIGS. 8-9). Three thermometer-coded comparator outputs C0, C1, C2, represent the possible symbol values −3, −1, +1, +3 as 000, 001, 011, and 111, respectively. The digitizer converts these into two binary outputs representing the possible symbol values as 00, 01, 10, and 11, respectively. Digitizer 1000 passes the C1 signal through as B1, and employs a multiplexer 1004 (hereafter "combination multiplexer") to combine the C0-C2 signals to determine the appropriate value of the B0 signal. Combination multiplexer 1004 accepts C0 and C2 as inputs, and employs C1 as a selection signal. When C1 is low, the output of combination multiplexer 1004 corresponds to C0. When C1 is high, the output of combination multiplexer 1004 corresponds to C2.

To enable DFE designed for PAM4 to also operate with NRZ signaling where only two symbol values are allowed, digitizer 1000 includes a mode control multiplexer 1002. When the selection input to the mode control multiplexer is high (asserted), the C1 signal in addition to being passed through as B1, is also selected for B0, making the possible outputs 00 and 11. When the selection input is low, the mode control multiplexer selects the output of combination multiplexer 1004 as B0.

Figure 11A:
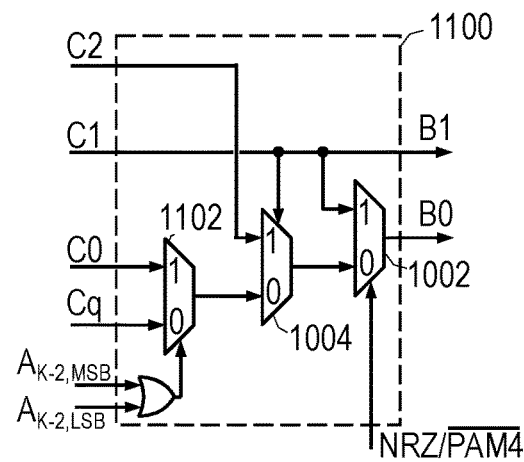
FIGS. 11A-11B are schematics of illustrative modified digitizers.

FIG. 11A shows a modified digitizer 1100 suitable for use in modified decision element 913D (FIG. 9). It includes the mode control multiplexer 1002 and combination multiplexer 1004 previously described with reference to FIG. 10. In addition to comparator outputs C0-C2, digitizer 1100 receives an output Cq from an additional comparator. When the twice-preceding symbol ($A_{k-2}$) has a value of −3, a substitution multiplexer 1102 substitutes Cq for C0 at the input to the combination multiplexer 1004. Here, the most significant and least significant bits of the binary representation of $A_{k-2}$ are combined with logical-OR to provide the selection input to the substitution multiplexer. Other symbol representations would be handled differently, e.g., in a thermometer-coded representation of $A_{k-2}$, the first comparator output C0 could be used as the selection signal.

Figure 11B:
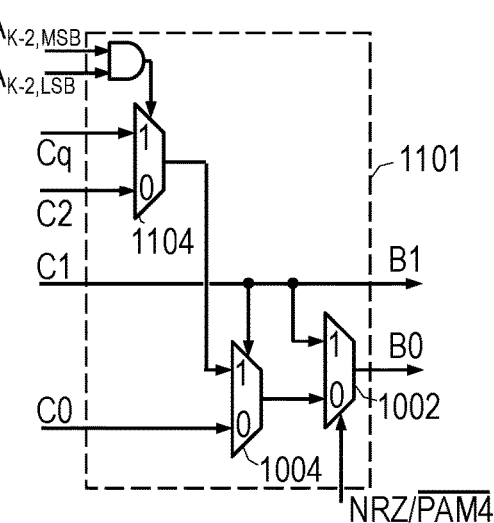

FIG. 11B shows a modified digitizer 1101 suitable for use in modified decision element 913A (FIG. 9). It includes the mode control multiplexer 1002 and combination multiplexer 1004 previously described with reference to FIG. 10. A substitution multiplexer 1104 substitutes Cq for C2 at the input to the combination multiplexer when the twice preceding symbol $A_{k-2}$ has a value of +3. Here, the most significant and least significant bits of the binary representation of $A_{k-2}$ are combined with a logical-AND to provide the selection input to substitution multiplexer 1104, but other approaches would also be suitable depending on the symbol representation.

Numerous alternative forms, equivalents, and modifications will become apparent to those skilled in the art once the above disclosure is fully appreciated. For example, the fractional unrolling performed herein was intermediate between the first and second taps, but such fractional unrolling could be performed with less than a single tap, or more than two taps. (Though this changes the number of preceding symbols accounted for by the precompensation module, the first and second type of thresholds would continue to differ by one in terms of the number of preceding symbols that are accounted for.) Further, the DFEs shown here provide only one symbol decision per clock cycle. At particularly high data rates, it may become necessary or desirable to apply parallelization techniques to output multiple symbol decisions per clock cycle as is done in, e.g., U.S. Pat. No. 9,071,479 ("High-speed parallel decision feedback equalizer") which is hereby incorporated herein by reference in its entirety. Still further, the specific examples provided herein presume the use of PAM4 signaling, but the principles are readily applicable to NRZ signaling. It is intended that the claims be interpreted to embrace all such alternative forms, equivalents, and modifications that are encompassed in the scope of the appended claims.

What is claimed is:

1. A decision feedback equalizer that comprises:
   a precompensation unit including:
      decision elements each having comparators to compare an equalized signal to a respective symbol decision threshold of a first type, the first type of symbol decision threshold accounting for trailing intersymbol interference from a first number of speculative preceding symbols, each decision element having different speculative preceding symbol values than the other decision elements; and
      an additional comparator in at least one of the decision elements to compare the equalized signal to a symbol decision threshold of a second type, the second type of symbol decision threshold accounting for trailing intersymbol interference from a second number of speculative preceding symbols, the second number being greater than the first;
   a register that tracks preceding symbol decisions of the decision feedback equalizer;
   a multiplexer that supplies symbol decisions to the register by selecting, based on the preceding symbol decisions, from tentative symbol decisions of the decision elements;

a feedback filter that derives a feedback signal from the preceding symbol decisions; and
a summer that subtracts the feedback signal from a filtered signal to produce the equalized signal,
wherein the preceding symbol decisions from which the feedback signal is derived include a preceding symbol decision accounted for by the second type of symbol decision threshold, the feedback signal compensating for a linear component of trailing intersymbol interference and the second type of decision threshold compensating for a nonlinear component of the trailing intersymbol interference.

2. A decision feedback equalizer that comprises:
a precompensation unit including:
decision elements each having comparators to compare an equalized signal to a respective symbol decision threshold of a first type, the first type of symbol decision threshold accounting for trailing intersymbol interference from a first number of speculative preceding symbols, each decision element having different speculative preceding symbol values than the other decision elements;
an additional comparator in at least one of the decision elements to compare the equalized signal to a symbol decision threshold of a second type, the second type of symbol decision threshold accounting for trailing intersymbol interference from a second number of speculative preceding symbols, the second number being greater than the first;
a register that tracks preceding symbol decisions of the decision feedback equalizer; and
a multiplexer that supplies symbol decisions to the register by selecting, based on the preceding symbol decisions, from tentative symbol decisions of the decision elements,
wherein each of the decision elements includes a digitizer that converts outputs of the comparators into a binary number representation of a tentative symbol decision, and
wherein the digitizers of the decision elements having the additional comparator each include a multiplexer to substitute an output of the additional comparator for another comparator output when a preceding symbol decision has a predetermined value.

3. The decision feedback equalizer of claim 2, wherein each of the decision elements provides a tentative symbol decision to the multiplexer in a thermometer-coded format.

4. The decision feedback equalizer of claim 2, wherein each of the decision elements is switchable between non-return to zero ("NRZ") and 4-level pulse amplitude modulation ("PAM4") symbols.

5. A decision feedback equalization method that comprises:
tracking preceding symbol decisions;
converting an equalized signal into tentative symbol decisions with a precompensation unit having a decision element for each combination of a first number of speculative preceding symbols, with comparators in each decision element using a first type of symbol decision threshold that accounts for trailing intersymbol interference from the corresponding combination, and with an additional comparator in at least one of the decision elements using a second type of symbol decision threshold that accounts for trailing intersymbol interference from a second number of speculative preceding symbols, the second number being greater than the first;
based on the preceding symbol decisions, selecting from the tentative symbol decisions;
deriving a feedback signal from the preceding symbol decisions; and
subtracting the feedback signal from a filtered signal to produce the equalized signal,
wherein the preceding symbol decisions from which the feedback signal is derived include a preceding symbol decision accounted for by the second type of symbol decision threshold, the feedback signal compensating for a linear component of trailing intersymbol interference and the second type of decision threshold compensating for a nonlinear component of the trailing intersymbol interference.

6. A decision feedback equalization method that comprises:
tracking preceding symbol decisions;
converting an equalized signal into tentative symbol decisions with a precompensation unit having a decision element for each combination of a first number of speculative preceding symbols, with comparators in each decision element using a first type of symbol decision threshold that accounts for trailing intersymbol interference from the corresponding combination, and with an additional comparator in at least one of the decision elements using a second type of symbol decision threshold that accounts for trailing intersymbol interference from a second number of speculative preceding symbols, the second number being greater than the first; and
based on the preceding symbol decisions, selecting from the tentative symbol decisions,
wherein said converting includes obtaining binary representations of the tentative symbol decisions by digitizing the comparator outputs, and
wherein in the decision elements having an additional comparator, said digitizing includes substituting an output of the additional comparator for another comparator output when a preceding symbol decision has a predetermined value.

7. The decision feedback equalization method of claim 6, wherein each of the decision elements is switchable between non-return to zero ("NRZ") and 4-level pulse amplitude modulation ("PAM4") symbols.

8. A decision feedback equalization method that comprises:
tracking preceding symbol decisions;
filtering a received signal with a feed forward equalizer (FFE) filter to obtain an equalized signal;
converting the equalized signal into tentative symbol decisions with a precompensation unit having a decision element for each combination of a predetermined number of speculative preceding symbols, with comparators in each decision element using symbol decision thresholds that account for trailing intersymbol interference from the corresponding combination;
based on the preceding symbol decisions, selecting a subsequent symbol decision from the tentative symbol decisions;
for each decision eye, finding an upper edge position below which the equalized signal occurs with a predetermined probability and a lower edge position above which the equalized signal occurs with the predetermined probability; and
adjusting the symbol decision thresholds to lie midway between the upper and lower edge positions.

9. The decision feedback equalization method of claim 8, wherein said finding is performed with one or more level finders.

10. The decision feedback equalization method of claim 9, wherein the one or more level finders determine the upper and lower edge positions conditioned upon a predetermined pattern for the preceding or subsequent symbol decisions.

11. The decision feedback equalization method of claim 8, further comprising:
   combining the equalized signal with the subsequent symbol decision to obtain an error signal or error polarity signal; and
   adapting coefficients of the FFE filter based on the error signal or error polarity signal.

12. A decision feedback equalizer that comprises:
   a register that tracks preceding symbol decisions;
   a precompensation unit including a decision element for each combination of a predetermined number of speculative preceding symbols, with comparators in each decision element using symbol decision thresholds that account for trailing intersymbol interference from the corresponding combination;
   a multiplexer that supplies symbol decisions to the register by selecting, based on the preceding symbol decisions, from tentative symbol decisions of the decision elements;
   one or more level finders that determine, for each decision eye, an upper edge position below which the equalized signal occurs with a predetermined probability and a lower edge position above which the equalized signal occurs with the predetermined probability; and
   a controller that adjusts the symbol decision thresholds to lie midway between the upper and lower edge positions.

13. The decision feedback equalizer of claim 12, wherein the one or more level finders determine the upper and lower edge positions conditioned upon a predetermined pattern for the preceding symbol decisions.

* * * * *